3 Sheets—Sheet 1.
R. EICKEMEYER.
GRAIN GATHERERS AND BINDERS.
No. 190,426. Patented May 8, 1877.
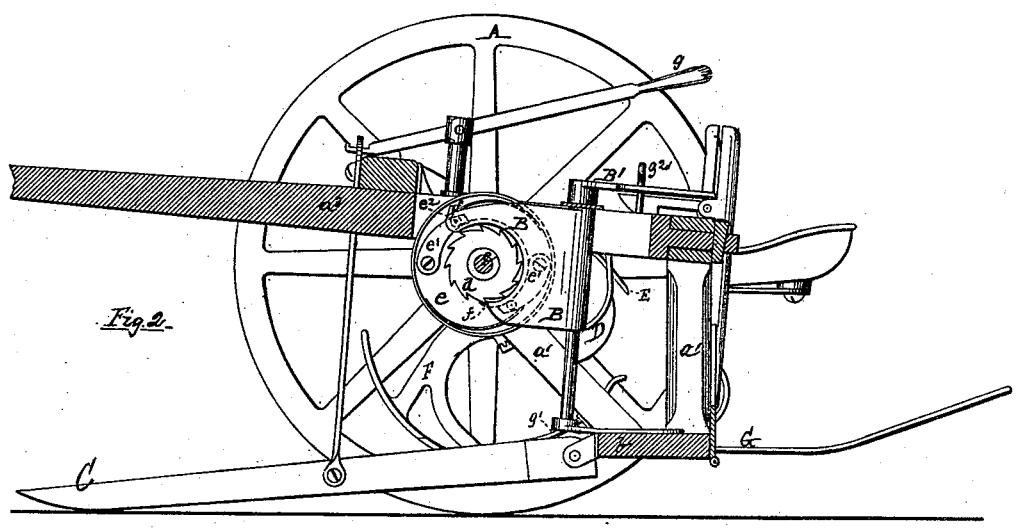
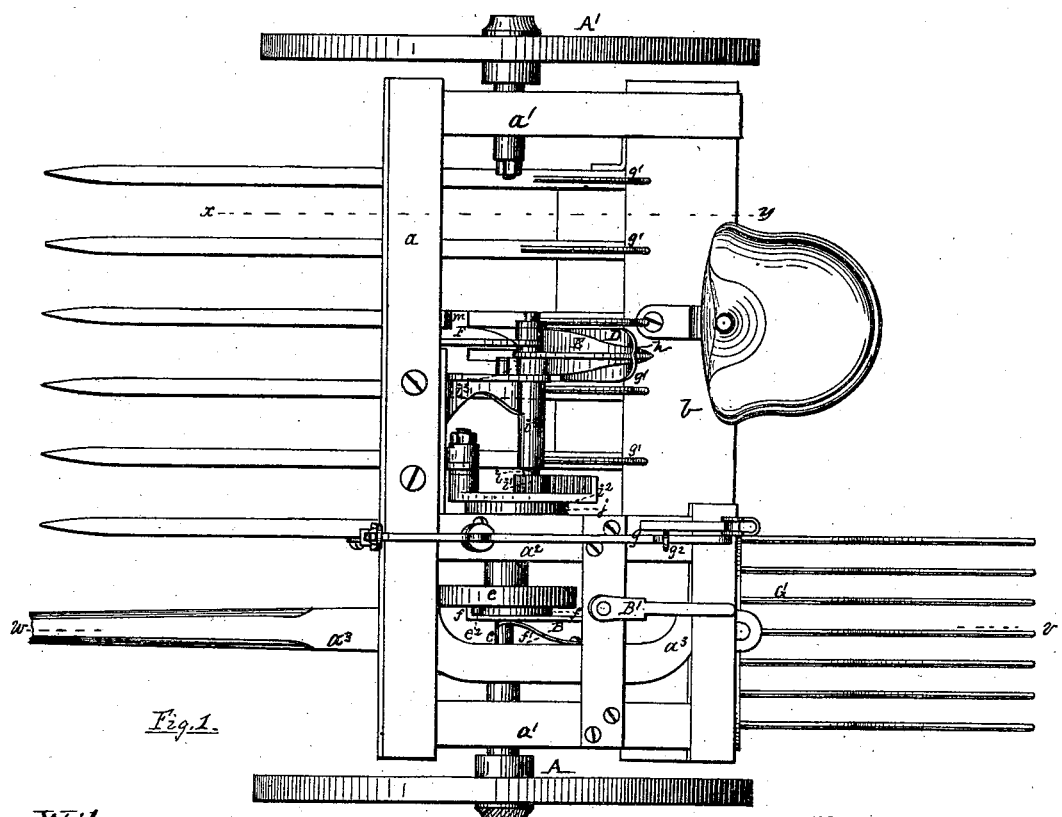
Witnesses:
Philip F. Larner
A. B. Cauldwell
Inventor:
Rudolf Eickemeyer
By Wm. C. Wood
Attorney 3 Sheets—Sheet 2.
R. EICKEMEYER.
GRAIN GATHERERS AND BINDERS.
No. 190,426. Patented May 8, 1877.
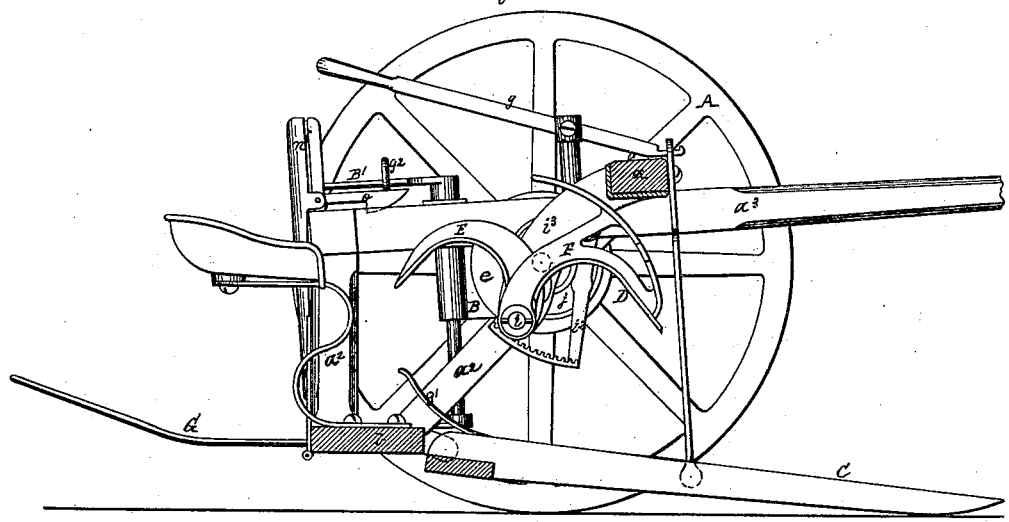
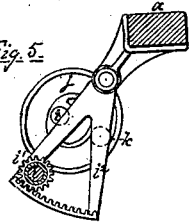
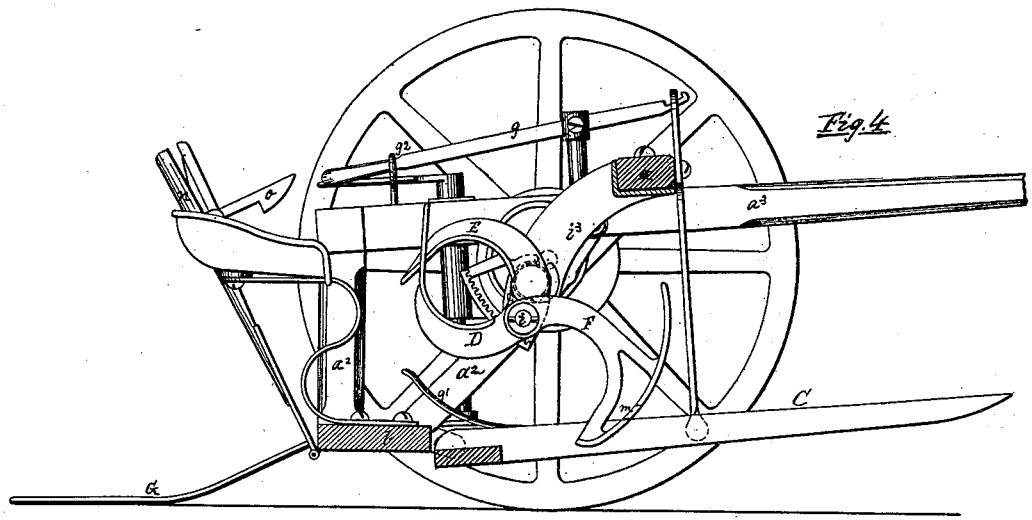
Witnesses:
Philip F. Larner
A. B. Cauldwell
Inventor:
Rudolf Eickemeyer
By Wm. E. Wood
Attorney 3 Sheets—Sheet 3.
R. EICKEMEYER.
GRAIN GATHERERS AND BINDERS.
No. 190,426. Patented May 8, 1877.
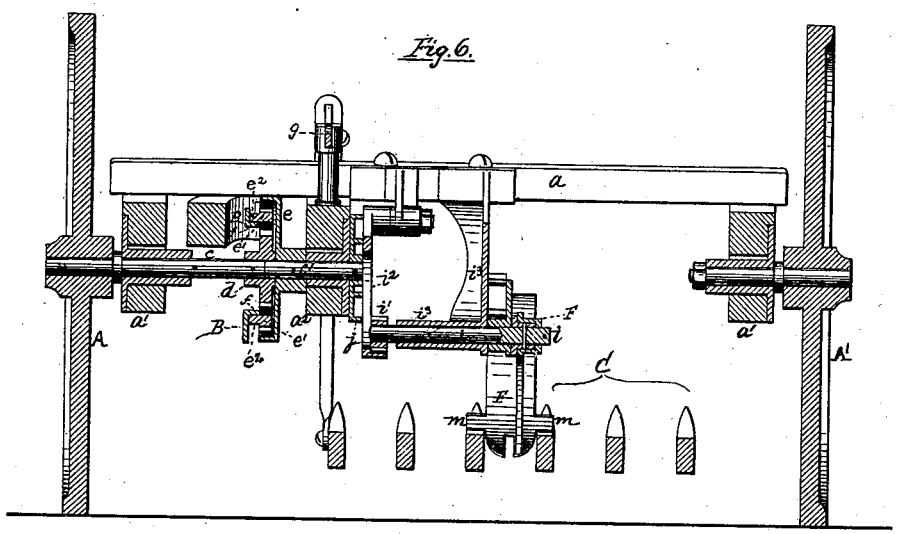
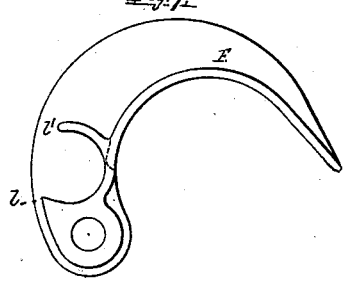
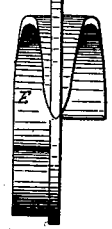
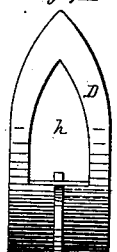
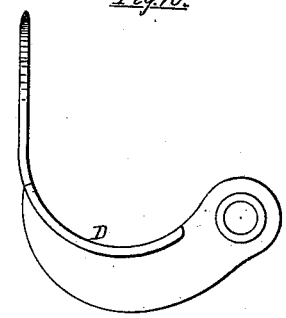
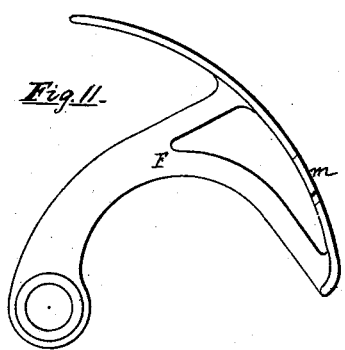
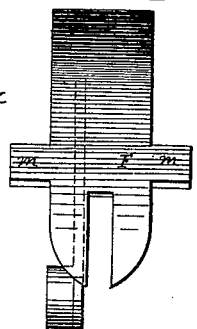
Witnesses:
Philip F. Larner
A. B. Cauldwell
Inventor:
Rudolf Eickemeyer
By Wm C Ward
Attorney

UNITED STATES PATENT OFFICE.

RUDOLF EICKEMEYER, OF YONKERS, NEW YORK.

IMPROVEMENT IN GRAIN GATHERERS AND BINDERS.

Specification forming part of Letters Patent No. 190,426, dated May 8, 1877; application filed March 1, 1877.

*To all whom it may concern:*

Be it known that I, RUDOLF EICKEMEYER, of the city of Yonkers, in the county of Westchester and State of New York, have invented certain new and useful Improvements in Horse-Rakes for Gathering and Bundling Cut Grain; and I do hereby declare that the following specification, taken in connection with the drawings forming a part of the same, is a clear, true, and complete description of my invention.

One feature of my invention consists in the combination, with a horse-rake, a lifting-arm, and a clamping-arm, of a separator, which, while the lifting-arm is performing its work, rests upon the surface of the rake, and prevents the grain gathered thereon from moving rearward and occupying the path of the lifting-arm, and which is lifted from the rake simultaneously with the backward movement of the lifting-arm, so that the grain may then be pushed rearward by the new grain gathered on the rake.

My invention consists, further, in the combination, with bundling apparatus, of a rake hinged at its base to the frame of a horse-rake having long teeth, the front ends of which float upon the surface of the ground when in operation, and a lifting-lever and a holding-hook, whereby the rake may be raised by the driver to pass obstacles, and maintained in an elevated position while the horse-rake is in transit.

My invention further consists in the specific novel combinations of mechanism whereby the axle of the driving-wheel is connected with, and disconnected from, the driving-shaft which operates the lifting-arm, which consists in the combination, with the axle and a ratchet-wheel thereon, of a driving-shaft and a collar thereon, having two pawls which engage with the ratchet, and a lever which always controls one or the other of the pawls, and which, unless specially manipulated, will control both of said pawls, and prevent their engagement with the ratchet. Said lever, on being swung by the driver, will release one of said pawls, so that it will, through the axle and ratchet, impart only a half-revolution to the driving-shaft, and then be disengaged from its ratchet by said lever. In other words, the pawls alternately engage with the ratchet, and will cause the driving-shaft to continuously rotate, (which is seldom if ever desired,) or, at the will of the driver, by means of the lever, they will cause the driving-shaft to make only one-half of a revolution, followed by a full stop, with intervals between said stops of such duration as the driver may elect, he being governed in practice by the bulk of the grain on which the horse-rake is operating.

To more particularly describe my invention, I will refer to the accompanying three sheets of drawings, in which—

Figure 1, Sheet 1, represents, in plan view, a rake embodying my improvements. Fig. 2 represents the same in longitudinal vertical section on line $w$ $v$, Fig. 1. Fig. 3, Sheet 2, represents the same in longitudinal vertical section on line $x$ $y$, Fig. 1, with the lifting-arm and separator raised from the rake. Fig. 4, Sheet 2, represents the same as in Fig. 3, but with the separator resting on the rake, and the lifting-arm elevated as if compressing a bundle of grain between it and the clamping-arm. The rake is also elevated as when not desired for service. Fig. 5 represents, in detail, the cam and segmental rack gear-lever which operates the lifting-arm. Fig. 6, Sheet 3, represents my rake in lateral vertical section on a line with the axes of the wheels of the rake. Figs. 7 and 8 represent, respectively in side and end view, the clamping-arm on an enlarged scale. Figs. 9 and 10 represent, respectively, in like manner the lifting-arm. Figs. 11 and 12 represent, respectively, in like manner the separator.

The frame of the machine embraces a cross-bar, $a$, to which the shafts or a pole, as at $a^3$, is connected; three triangular trusses, two of which, as at $a^1$, constitute the ends of the frame, the third, at $a^2$, serving as a support for a driving-shaft; and a platform at $b$, on which the driver's seat is mounted. This platform is suspended below and at the rear of the axle by means of the three trusses. The truss $a^2$ is connected at its rear upper end with the adjacent truss $a^1$ by a cross-bar, to which the rear end of the pole is connected.

The frame is supported on two wheels, A and A', which are mounted upon independent axes. The wheel A' revolves on its axle, which is a short one, secured to the frame near the upper front end of the adjacent truss. The wheel A is keyed to its axle $c$, which connects with the driving-shaft. A long bearing is provided for the axle $c$, and at its inner end it is provided with a ratchet-wheel, $d$. Mounted in a suitable bearing in the truss $a^2$ is a driving-shaft, as at $c'$, the outer end of which is housed in the eye of the ratchet-wheel $d$, as shown in Fig. 6. This shaft $c'$ has keyed to its outer end a flanged collar, $e$, within which the ratchet-wheel $d$ is located. On the side of the flanged collar are two pawls, as at $e^1$, which, when not prevented, engage with the teeth of the ratchet-wheel, and thereby rotatively connect the axle $c$ with the shaft $c'$. Each pawl, near its free end, has a laterally-projecting pin, as at $e^2$. The pawls are controlled by the wing-lever B, which is mounted on a vertical shaft, having, at its upper end, a hand-lever, B'. The wing-lever B has, on its inner face, an inwardly-projecting flange, as at $f$, which is semicircular in its outline. This flange $f$ operates as a cam-surface for engaging with the pins $e^2$ on the pawls, and lifting said pawls from the teeth of the ratchet, thus disconnecting the axle from the driving-shaft $c'$, except when one or the other of the pawls is released through the movement of the hand-lever B'. The lower end of the flange $f$ is beveled, so that the pawl-pins are freely engaged thereby and forced from their engagement with the ratchet-teeth. The flange $f$ is so proportioned to the size of the ratchet-wheel that both pawls may be under its control at the same time, although the pawls are located opposite to each other; but the extent of the movement of the wing-lever B is such that only the pawl in contact with the upper portion of the flange can be released, the other pawl still being held by it. The wing-lever is normally forced toward the ratchet-wheel by a spring, as at $f'$, Fig. 1. The upper end of the flange $f$ is curved upward, forming a retaining-pocket for one pawl-pin when both pawls are disengaged from the ratchet.

With these parts thus constructed and arranged, it will be seen that when the wing-lever B is in its normal position, it will hold one or both of the pawls from the ratchet. If both of them are thus held there will be no movement of the shaft $c'$. If one of them only be held, then the other will be engaged with the ratchet, and will cause the shaft $c'$ to make one-half of a revolution only, because when the working pawl reaches the lower end of the flange $f$ it will then be lifted from the ratchet, and the pin of the non-working pawl will by that time abut against the curved upper end of the flange, and therefore if a pawl be released by the hand-lever, and the latter then be permitted to resume its normal position, the shaft $c'$ will always make but one half-revolution; but if the hand-lever be not permitted to resume its normal position, the pawls will then be alternately engaged with the ratchet, and thereby cause the shaft $c'$ to be continuously revolved. This peculiar method of controlling said shaft $c'$ is a matter of importance, as will be readily seen.

C denotes the rake, composed of a suitable number of long strong teeth, connected by a bar, which is hinged to the platform $b$ at its front edge. The front ends of the teeth, at their lower edges, are curved, so that they will ride freely in the stubble on the surface of the ground. When not in use the rake is tilted upward by the link and lever $g$, and secured by a suitable catch, as at $g^2$. At the base of each rake-tooth, on its upper edge, is an upwardly-curved guard, as at $g^1$. When lowered so that the rake-teeth are on the surface of the ground, and while the rake is advancing, the grain is gathered up on the teeth and forced rearward until arrested by the guards $g^1$. When in use the lever is used for elevating the rake in passing obstacles. The stubble projecting upward between the teeth assists in forcing the grain rearward as the rake advances.

D denotes the lifting-arm which lifts the grain from the base of the rake. It is semicircular in form, pointed at the end, so that it may pass freely downward through the straw, and has near its point an open space, as at $h$. It has also on its rear side a projecting central web for strengthening purposes. It is secured to the end of the horizontal shaft $i$, which has a long bearing in a hanger, $i^3$, suspended from the cross-bar $a$ of the frame. At the opposite end of the shaft $i$ is a gear, $i^1$, which meshes with the teeth of a suspended vibrating segmental gear-lever, as at $i^2$, which has its pivot secured to the cross-bar $a$. A vibratory motion is imparted to the gear-lever by means of the cam $j$, which is secured to the end of the driving-shaft $c'$, as illustrated in Fig. 5. The cam $j$ has a groove on its front side, which is occupied by a friction-roller on a pin which projects laterally from the gear-lever, as shown at $k$. The groove of the cam is so proportioned that the lever $i^2$ is moved forward and backward at every complete revolution of the cam, and through the pinion and the shaft $i$, like movements are imparted to the lifting-arm. The teeth of the gear-lever and of the pinion $i^1$ will preferably be housed, in a manner well known, so as to protect them from straw and dirt.

E denotes the clamping-arm. It is similar in form to the lifting-arm, but has its point so proportioned that it can pass through the open space $h$ in said lifting-arm, and this enables these two arms to embrace and compress into good bundling condition as much of the grain as the lifting-arm may raise from the rake. The clamping-arm is supported by the shaft $i$, and is maintained in its elevated position by a lug on the hanger, which abuts against a shoulder on the arm, as at $l$. A spring (not shown) abuts against the hanger and the shoulder $l'$ on the arm, which renders said arm slightly yielding as against the pressure of the lifting-arm upon a bundle interposed between it and the clamping-arm.

F denotes the separator. In side view it resembles a segment of a pulley with one curved arm. It has a width somewhat less than the space between two teeth of the rake, and has two lateral projections near its end, as at $m$, which, when the separator is depressed and in working position, rest upon the upper edges of the adjacent rake-teeth, while the end or point of the separator extends slightly below. The separator has a hub which loosely surrounds the hub of the lifting-arm, and this locates the lifting-arm and the separator in the same plane, so that when the lifting-arm is thrown backward and upward, it lifts the separator from the rake-teeth, and this allows the grain to accumulate at the base of the rake against the guards $g^1$; and, also, so that when the lifting-arm is moved downward to gather a bundle, the separator is permitted to fall and arrest the advance of the grain on the rake until the return movement of the lifting-arm.

G denotes a dumping-platform, composed of tines extending rearward from the machine at one side thereof. It is hinged to the rear of the platform $b$, and is provided with a vertical standard, $n$, which has a latch, $o$, near its top, for securing the standard at its upper end to the frame, and maintaining the dumping-platform in a horizontal position. The driver, on manipulating the latch, releases the standard, and the platform tilts until its tines touch the ground, thereby discharging such bundles as may have been placed on the platform.

The manner of working my rake is as follows: It will be assumed that the rake is lowered, the lifting-arm and clamping-arm elevated, and the dumping-platform locked, as shown in Fig. 3. As the rake advances, its teeth gather the grain, which is forced rearward against the guards at the base of the rake-teeth. When a sufficient quantity has accumulated at that point to form a bundle the driver draws toward him the hand-lever B' and releases one of the pawls $e^1$, which then engages with its ratchet, thereby swinging the lifting-arm downward through the grain, thence upward into clamping relations with the clamping-arm, thereby compressing the grain and holding it while the driver binds the bundle, or while any suitable automatic binding mechanism is operated. With the downward movement of the lifting-arm the separator descends, and prevents the advance of grain toward the base of the rake, these parts occupying the positions shown in Fig. 4. When the driver releases the lever B' from his hand its spring places the wing-lever B into such a position that the lifting-arm makes this single movement and then stops. When the bundle has been bound the lever B' is again withdrawn, and the lifting-arm moves backward and upward, lifting the separator from the rake, and then the grain on the rake is free to be pushed backward to the guards. The bundle, being released, is then transferred by the operator to the dumping-platform, which, when it contains enough bundles to form a stack, is released, tilted, and the bundles rolled together upon the ground.

It will be seen that the lifting-arm, although moved in both directions by positively-operated mechanism, can make no movement whatever except the hand-lever be moved, and that, the lever having been moved and released from the hand, but one movement of said arm will be made, leaving the driver free to employ both hands for handling the binding material, for binding the bundle, and for transferring the bundle to the tilting platform.

Having thus described my invention, I claim as new and desire to secure by Letters Patent—

1. The combination, with a horse-rake, of a lifting-arm, a clamping-arm, and a separator, substantially as described, whereby, while the lifting and clamping arms are operating, the separator prevents the grain, as it is accumulated on the rake, from moving to the rear thereof, as set forth.

2. The combination, with bundling apparatus, of the rake-teeth secured to a bar hinged to the frame of a horse-rake, and arranged at their front ends to float upon the surface of the ground, and a lifting-lever and hook, substantially as described, whereby the rake may be elevated for passing obstacles, and while the rake is being conveyed from place to place, as set forth.

3. The combination, with the axle and its ratchet, of a shaft for operating a lifting-arm, having a flanged collar provided with two spring-pawls, oppositely located thereon, and a spring-lever provided with a semicircular flange, which always maintains control of one or the other of the pawls, whereby said shaft may be driven but one-half of a revolution by the release of a pawl from the semicircular flange, as set forth.

R. EICKEMEYER.

Witnesses:
  G. OSTERHELD,
  GEORGE NARR.